United States Patent [19]

Brick

[11] Patent Number: 6,050,022

[45] Date of Patent: Apr. 18, 2000

[54] FISHING LURE

[76] Inventor: Derek Ross Joseph Brick, 1213 Derbyshire St., Ballwin, Mo. 63021

[21] Appl. No.: 09/385,426

[22] Filed: Aug. 30, 1999

[51] Int. Cl.[7] .................................................. A01K 85/00
[52] U.S. Cl. ........................... 43/26.2; 43/42.26; 43/42.3
[58] Field of Search ................................ 43/26.2, 42.26, 43/42.28, 42.3, 42.27; 446/355, 356, 390

[56] References Cited

U.S. PATENT DOCUMENTS

| | | | |
|---|---|---|---|
| 726,021 | 4/1903 | Bryan . | |
| 891,037 | 6/1908 | Caldwell | 43/26.2 |
| 1,842,751 | 1/1932 | Hannon et al. . | |
| 2,284,183 | 5/1942 | Wade . | |
| 2,418,527 | 4/1947 | Riggan | 43/26.2 |
| 2,607,151 | 8/1952 | Morris et al. . | |
| 2,813,365 | 11/1957 | Cross | 43/26.2 |
| 4,038,773 | 8/1977 | Castelletti et al. | 43/26.2 |
| 4,674,223 | 6/1987 | Pearce . | |

*Primary Examiner*—Jack W. Lavinder
*Attorney, Agent, or Firm*—Stephen R. Greiner

[57] ABSTRACT

A self-propelled fishing lure shaped like a grasshopper and having a pair of articulated legs extending from its opposite sides. The legs are connected to a wind-up motor within the body which moves them at pulsed intervals. Pulsed movement of the outer portions is both forward and away from the body thereby affecting a swimming motion to drive the lure forward through the water. A pin, having an eyelet at its outer end for fastening to a fishing line, extends into the motor and may be pulled outwardly to release the motor and bring movement to the legs.

15 Claims, 2 Drawing Sheets

FISHING LURE

FIELD OF THE INVENTION

The present invention relates generally to fishing apparatus and, in particular, a motor-operated, artificial bait.

BACKGROUND OF THE INVENTION

Most fisherman at one time or other have spotted an area appearing to provide ideal habitat for their quarry but have not been able to cast to it because of obstacles like overhanging tree branches. Confronted with this problem, some have proposed self-propelled fishing lures. Unfortunately, such lures have not seen widespread acceptance because of their cost, complexity and unreliability. A need has, therefore, arisen for a self-propelled fishing lure which can withstand both the repeated strikes of fish and the high loads imparted when a hooked fish is being retrieved.

SUMMARY OF THE INVENTION

In light of the problems associated with the prior art, it is a principal object of the invention to provide a durable, motor-operated, self-propelled, fishing lure which may be selectively and repeatedly energized by line after casting. Such a lure is capable of swimming on its own into areas where a user cannot otherwise cast.

It is another object of the invention to provide a lure with a configuration and action like that of a grasshopper—an insect which many game fish, like bass, will seek out and attempt to eat. The action is pulsed such that the lure will kick intermittently.

It is a further object of the invention to provide a fishing lure of the type described which is easy to use and may be operated without resort to special tools or lengthy periods of instruction.

It is an object of the invention to provide improved elements and arrangements thereof in a fishing lure for the purposes described which is lightweight in construction, inexpensive to manufacture, and dependable in use.

Briefly, the fishing lure in accordance with this invention achieves the intended objects by featuring a hollow body and a wind-up motor positioned within said body. The motor has a rotatable axle with opposed ends extending from the body. A pair of articulated legs are positioned on the opposed ends of the axle for driving the lure atop water. A pin, having an eyelet at its outer end for fastening to a fishing line, extends into the motor and may be pulled outwardly to release the motor and bring movement to the legs.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
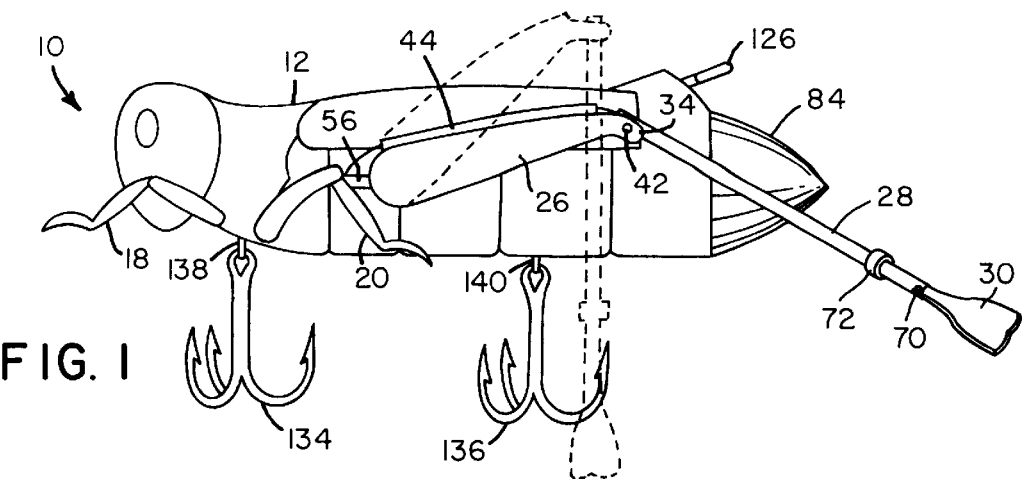
FIG. 1 is a side view of a fishing lure in accordance with the present invention.
Figure 2:
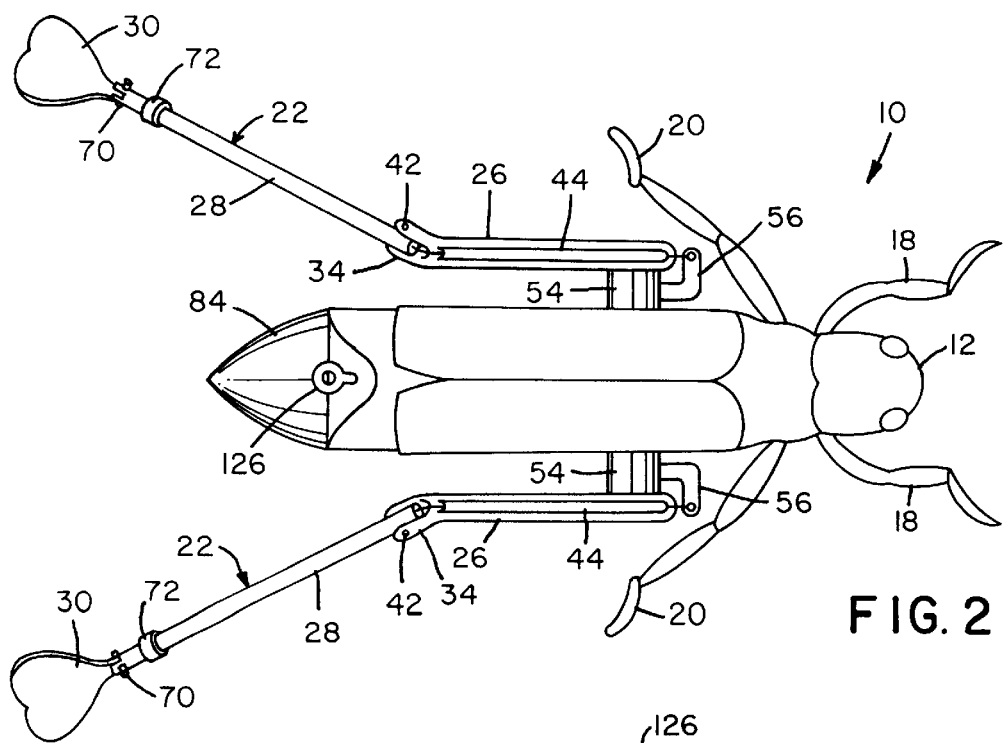
FIG. 2 is a top view of the fishing lure of FIG. 1.
Figure 3:
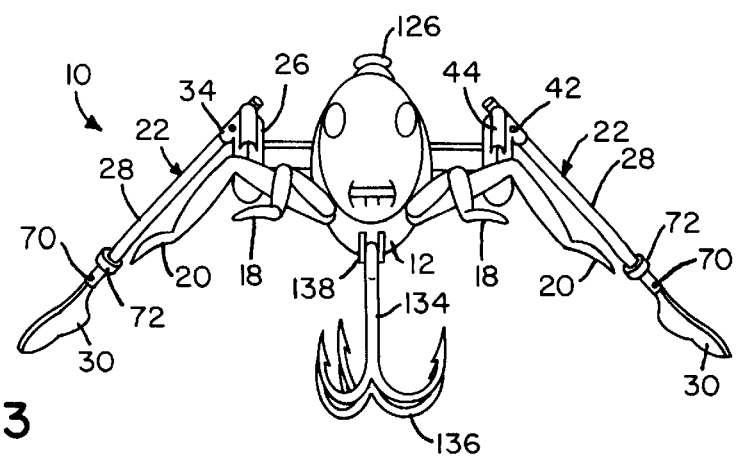
FIG. 3 is a front view thereof.
Figure 4:
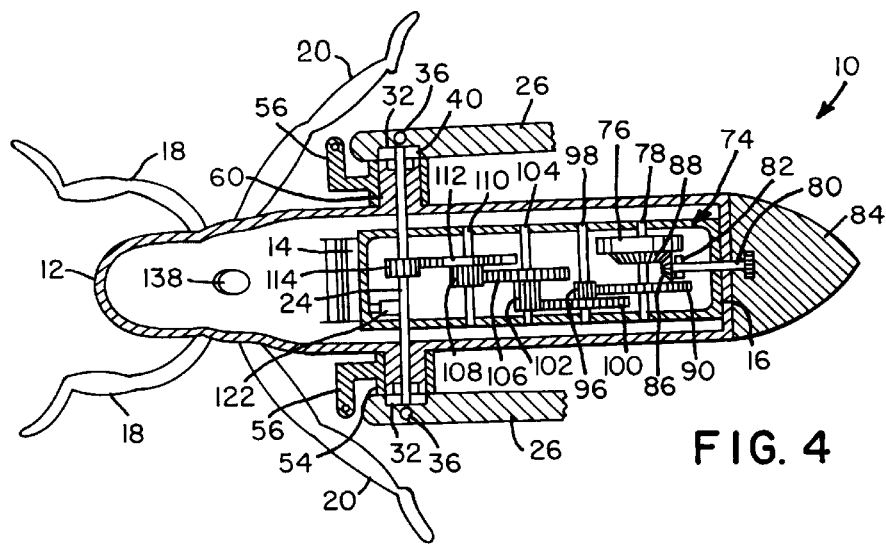
FIG. 4 is a cross-sectional view taken along line 4—4 of FIG. 1.
Figure 5:
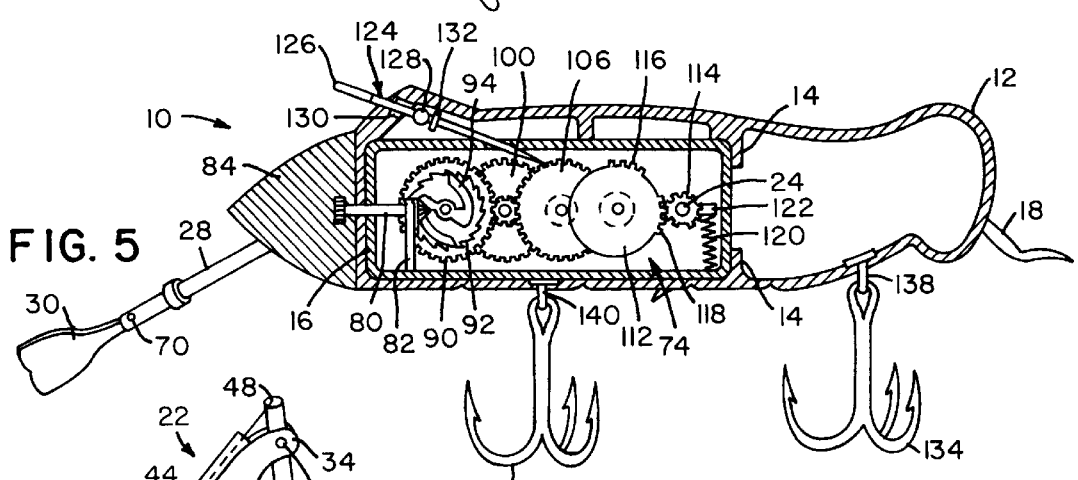
FIG. 5 is a cross-sectional view taken along line 5—5 of FIG. 2.
Figure 6:
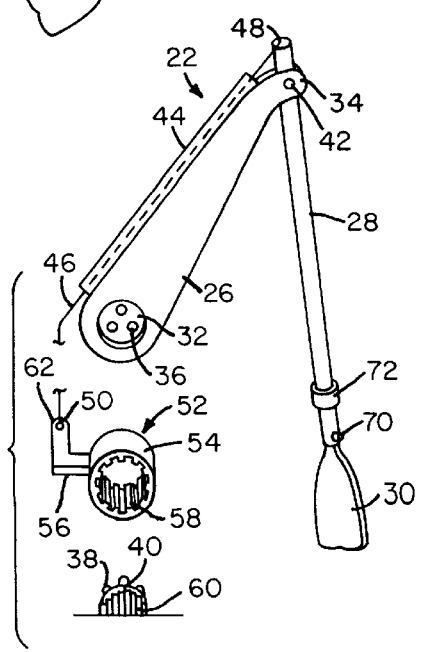
FIG. 6 is an exploded perspective view showing details of the right hind leg of the fishing lure.
Figures 7A, 7B:
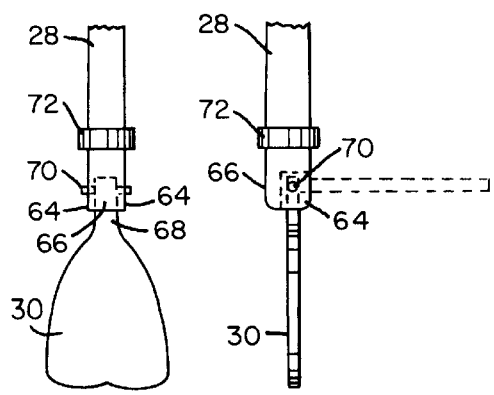
FIGS. 7A and 7B are, respectively, enlarged, front and side views of the free end of the right hind leg.

Referring now to the FIGS., a fishing lure in accordance with the present invention is shown at 10. Lure 10 includes a hollow body 12 molded from a lightweight plastic material to resemble, externally, the head, thorax, abdomen and wing portions of a grasshopper. For ease of assembly, body 12 may be made with abutting, upper and lower halves (not shown) which are adhesively sealed together. Internally, body 12 is provided with a number of suitably positioned retaining fins 14 to immovably position motor housing 16.

Forelegs 18 and middle legs 20 project outwardly from body 12 to simulate their counterparts on a real grasshopper. Forelegs 18 and middle legs 20 are preferably formed of a flexible and buoyant, plastic material. So constructed, forelegs 18 and middle legs 20 provide added floatation and lateral support to body 12.

Articulated hind legs 22 are pivoted on an axle 24 extending through body 12 rearwardly of middle legs 20. As shown, each hind leg 22 is shaped to mimic that of a grasshopper and includes a thigh portion 26 to which a calf portion 28 is hingedly attached. To the free end of each calf portion 28 is hingedly attached a paddle-like foot 30. So as to prevent lure 10 from being "tail heavy," each: thigh portion 26, calf portion 28 and foot 30 is formed from lightweight plastic.

Each thigh portion 26 has a circular recess 32 at its front end and a pair of calf-retaining tabs 34 at its rear end. The base of each recess 32 has three spherical sockets 36 adapted to receive a like number of ball-shaped projections 38 extending from one of the leg-retaining disks 40 affixed to the opposed ends of axle 24. Tabs 34, on the other hand, are positioned parallel to one another and are provided with axially aligned apertures through which a pivot pin 42 extends to attach a calf portion 28.

Extending along the upper edge of each thigh portion 26 is a tube 44 which may be either integrally formed with the remainder of the thigh portion or made separately and adhesively attached. The tube 44 serves as a passage for a flexible line 46 which, in a sense, acts like a muscle to extend a calf portion 28 relative to a thigh portion 26 in the manner of a kick. One end 48 of each line 46 is attached to the inner end of the calf portion 28 whereas the other end 50 is anchored to a shoulder portion 52 on body 12.

Each shoulder portion 52 includes a tubular sleeve 54 from which an L-shaped retaining bracket 56 extends. Preferably, sleeve 54 has an aperture defined by toothed side wall 58 adapted to snugly mate with a similarly toothed body projection 60 within which the ends of axle 24 are journaled. The free end of bracket 56 is provided with a loop 62 to which line 46 may be tied or otherwise secured. By adjusting the orientation of the sleeve 54 on projection 60, the tension in line 46, and hence the length of the kick of hind leg 22, can be adjusted.

The lower end of each calf portion 28 is provided with a pair of parallel, foot-retaining tabs 64 with axially aligned apertures. The tabs 64 are connected along their forward edges by a stop wall 66 so as to form a slot which opens downwardly and rearwardly. Within this slot, the narrowed upper end 68 of foot 30 is secured by a pivot pin 70 extending through the apertures in tabs 64.

The lower end of each calf portion 28 is also provided with an ankle weight 72. The weight 72 is preferably ring shaped, is formed from a dense metal such as lead, and is held in place by adhesive cement. The weight 72 serves to maintain constant tension on line 46 for a smooth extension of hind leg 22 and to return said leg to a retracted state with calf portion 28 suspended vertically from thigh portion 26 as shown by broken lines in FIG. 1.

A wind-up motor 74 drives the hind legs 22. The motor 74 includes a spiral spring 76, one end of which is secured to motor housing 16 while the other end is secured to shaft 78. Shaft 78 is rotatably secured at its opposite ends to the sides of housing 16 and is rotated to wind up spring 76 by a shaft 80 supported by bracket 82 and extending through the rear of housing 16 and into a knob 84 simulative of the rear end of a grasshopper.

A bevel gear 86 is affixed to the front end of shaft 80 which meshes into a bevel gear 88 on shaft 78. Adjacent bevel gear 88, a gear 90 is rotatably mounted on shaft 78. Gear 90 includes a hollowed portion in one of its sides bounded by ratchet teeth 92. A pawl 94 is affixed to shaft 78 and engages the ratchet teeth 92 to permit shaft 78 to be rotated to wind spring 76 without the necessity of gear 90 being turned which would thereby force hind legs 22 into motion.

Motor 74 has gear reduction means. As shown, gear 90 meshes with a pinion 96 on a shaft 98 rotatably secured at its opposite ends to the sides of housing 16. Similarly, shaft 98 has a gear 100 which meshes with a pinion 102 on a shaft 104 rotatably secured at its opposite ends to the sides of housing 16. Likewise, shaft 104 carries a gear 106 which meshes with a pinion 108 on shaft 110 rotatably secured at its opposite ends to the sides of housing 16. Finally, shaft 110 has a gear 112 which meshes with a pinion 114 on axle 24 which transmits motion to hind legs 22.

Gear 112 is somewhat unusual since it does not possess teeth about its entire circumference rather it has teeth only in two spaced portions 116 and 118. Toothed portions 116 and 118 engage pinion 114 at predetermined intervals to angularly rotate axle 24 and, therefore, hind legs 22 a few degrees to the broken line position of FIG. 1 for the start of a kick. When the toothed portions 116 and 118 are not in contact with pinion 114, a compressed spring 120, having one end against housing 16 and the other against a flange 122 on axle 24, rapidly returns the axle 24 to a position wherein thigh portions 26 are in the lowered, solid line position shown of FIG. 1.

During lowering of thigh portions 26, lines 46 are pulled to cause calf portions 28 to kick out in a swimming motion thereby propelling lure 10 forward through the water. Simultaneously, stop walls 66 retain feet 30 in an outstretched position to "bite" as much water as possible. When thigh portions 26 are being elevated by action of toothed portions 116 and 118 on pinion 114, however, feet 30 tend to hinge backwardly reducing resistance and avoiding the possibility that lure 10 will swim backwards.

Unintended operation of motor 74 is prevented by a pin 124 which extends through openings in the tops of body 12 and housing 16. The pin 124 is tapered at its lower end to normally engage the teeth of gear 106. The upper end of pin 124, however, is provided with an eyelet 126 extending from the top of body 12 for attachment to a fishing line. Pulling on the eyelet 126, as occurs when lure 10 is cast with a fishing rod, disengages the lower end of pin 124 from gear 106 thus permitting the motor 74 to operate.

To prevent pin 124 from unintentionally falling back into gear 106 and stopping motor 74, pin 124 is provided with a ball 128 near its midpoint which is adapted to fit snugly yet releasably within the enlarged lower end of opening 130 provided in body 12 for the passage of pin 124.

Immediately below ball 128 is a horizontally disposed bar 132 for evenly distributing loads developed while reeling in a fish caught on hooks 134 and 136 suspended beneath body 12 by eyelets 138 and 140. Preferably, bar 132 has a length which is greater than the diameter of ball 128 and will not pass into the opening 130 but will, rather, press against the inside of body 12 when retrieving a catch.

Use of fishing lure 10 is straightforward. The user first attaches eyelet 126 to a fishing line (not shown) and then pushes the eyelet and pin 124 inwardly to engage gear 106 and prevent motor 74 from running. Next, the user rotates tail-like knob 84 to wind spring 76 in motor 74. Upon casting, pin 124 is pulled away from gear 106 and motor 74 starts to run. Articulated legs 22 are, of course, moved by motor 74 in a kicking action causing fishing lure 10 to swim forwardly.

Gear 112 helps create the impulsed action of legs 22. While motor 74 runs, teeth 116 and 118 on gear 112 periodically engage pinion 114 on axle 24 thereby rotating axle 24 against the force of coiled spring 120. When teeth 116 and 118 are disengaged from pinion 114, axle 24 jumps back to its original position by action of spring 120. Gear 112 causes legs 22 to kick in two quick impulses with a rest period occurring between the next two impulses and so forth; however, other kicking patterns could be produced by varying the number and spacing of teeth provided to gear 112.

The impulsed action of legs 22 mimics that of a live grasshopper swimming on top of water. It is the usual case that a grasshopper will kick in spurts and then rest for a brief period. Lure 10 continues its impulsed kicking action throughout the entire wind down of spring 76.

If desired, the action of a severely injured grasshopper can be simulated by removing one of legs 22 from the body 12. The ball and socket arrangement provided to each thigh portion 26 enables the legs 22 to detach easily from axle 24. A lure 10 with one leg 22 mimics an injured, one hind-legged grasshopper and swims in small circles.

The unique construction of lure 10 enables it to work its action on its own, without retrieve by a user. Because lure 10 can be steered by light tugs on a fishing line, it can be made to swim away from the user and under overhanging brush, fallen trees and the like to reach prime fish-holding habitats. Thus, a user is given access to fishing areas that have been inaccessible in the past and potentially more fish.

While the invention has been described with a high degree of particularity, it will be appreciated by those skilled in the art that modifications may be made thereto. For example, the body of the lure need not be made the shape of a grasshopper but may be provided with any desired configuration. Also, seals of any suitable type may be applied to all openings in body 12 to prevent the entry of water. Therefore, it is to be understood that the present invention is not limited to the sole embodiment described above, but encompasses any and all embodiments within the scope of the following claims.

I claim:

1. A fishing lure, comprising:

a hollow body;

a hook suspended from said hollow body;

a wind-up motor having a plurality of interconnected gears positioned within said hollow body, said motor having a rotatable axle with an end which extends outwardly from said body;

an articulated leg secured to said end of said axle;

a pin extending through an opening in said hollow body and into said motor so as to selectively engage one of said gears and stop said motor, said pin having an eyelet outside said hollow body for attachment to a fishing line.

2. The fishing lure according to claim 1 wherein one of said gears has two spaced portions of circumferential teeth and wherein said fishing lure further comprises:

a pinion on said axle for intermittently engaging said teeth;

a flange projecting from said axle remote from said pinion;

a compressed spring engaged with said flange so as to limit the rotation of said axle to a predetermined angular range.

3. The fishing lure according to claim 1 wherein said articulated leg includes:

a thigh portion secured to said axle, said thigh portion having a tube extending along its length;

a calf portion having an upper end hingedly attached to said thigh portion and a lower end spaced from said upper end;

a foot portion hingedly attached to said lower end of said calf portion; and, a flexible line extending freely through said tube and having first and second ends, said flexible line being attached at said first end to said body and being attached at said second end to said upper end of said calf portion.

4. The fishing lure according to claim 3 wherein a ball and socket connection secures said articulated leg to said axle.

5. The fishing lure according to claim 1 further comprising a plurality of buoyant forelegs and middle legs extending outwardly from said hollow body for stabilizing said fishing lure.

6. A fishing lure, comprising:

a hollow body;

a wind-up motor positioned within said hollow body, said wind-up motor having a rotatable axle with opposed ends extending outwardly from said hollow body;

a pair of articulated legs for kicking movement outside said hollow body, each of said articulated legs including:

a thigh portion secured to a respective one of the opposed ends of said axle, said thigh portion having a tube extending along its length;

a calf portion having an upper end hingedly attached to said thigh portion and a lower end spaced from said upper end;

a foot portion hingedly attached to said lower end of said calf portion; and, a flexible line extending through said tube and having first and second ends, said flexible line being attached at said first end to said body and at said second end to said upper end of said calf portion.

7. The fishing lure according to claim 6 wherein said wind-up motor includes a plurality of gears and wherein said fishing lure further comprises a pin extending through an opening in said hollow body and into said motor so as to selectively engage one of said gears thereby stopping said motor.

8. The fishing lure according to claim 7 wherein one of said gears has two spaced portions of circumferential teeth and wherein said fishing lure further comprises:

a pinion on said axle for intermittently engaging said teeth;

a flange projecting from said axle remote from said pinion;

a compressed spring engaged with said flange so as to limit the rotation of said axle to a predetermined angular range.

9. The fishing lure according to claim 7 wherein said pin includes an eyelet located outside said hollow body for attachment to a fishing line and includes a ball located within said hollow body adapted for a snug, releasable fit within said opening in said hollow body.

10. The fishing lure according to claim 6 wherein a ball and socket connection secures said articulated leg to said axle.

11. The fishing lure according to claim 6 further comprising at least one hook suspended from said hollow body.

12. The fishing lure according to claim 6 further comprising a plurality of buoyant forelegs and middle legs extending outwardly from said hollow body for stabilizing said fishing lure.

13. A fishing lure, comprising:

a hollow body;

a hook suspended from said hollow body;

a wind-up motor positioned within said hollow body, said windup motor including:

a rotatable axle with opposed ends extending outwardly from said hollow body, said axle carrying a pinion and a flange spaced from said pinion;

a plurality of interconnected gears for rotating said axle, one of said gears being adapted to intermittently engage said pinion and having spaced portions of circumferential teeth; and, a compressed spring engaged with said flange so as to limit the rotation of said axle to a predetermined angular range;

a pair of articulated legs for kicking movement outside said hollow body, each of said articulated legs including:

a thigh portion secured by a ball and socket connection to a respective one of the opposed ends of said axle, said thigh portion having a tube extending along its length;

a calf portion having an upper end hingedly attached to said thigh portion and a lower end spaced from said upper end;

a foot portion hingedly attached to said lower end of said calf portion; and, a flexible line extending through said tube and having first and second ends, said flexible line being attached at said first end to said body and at said second end to said upper end of said calf portion.

14. The fishing lure according to claim 13 wherein said fishing lure further comprises a pin extending through an opening in said hollow body and into said motor, selectively engaging one of said gears and stopping said motor.

15. The fishing lure according to claim 13 further comprising a plurality of buoyant forelegs and middle legs extending outwardly from said hollow body for stabilizing said fishing lure.

* * * * *